UNITED STATES PATENT OFFICE.

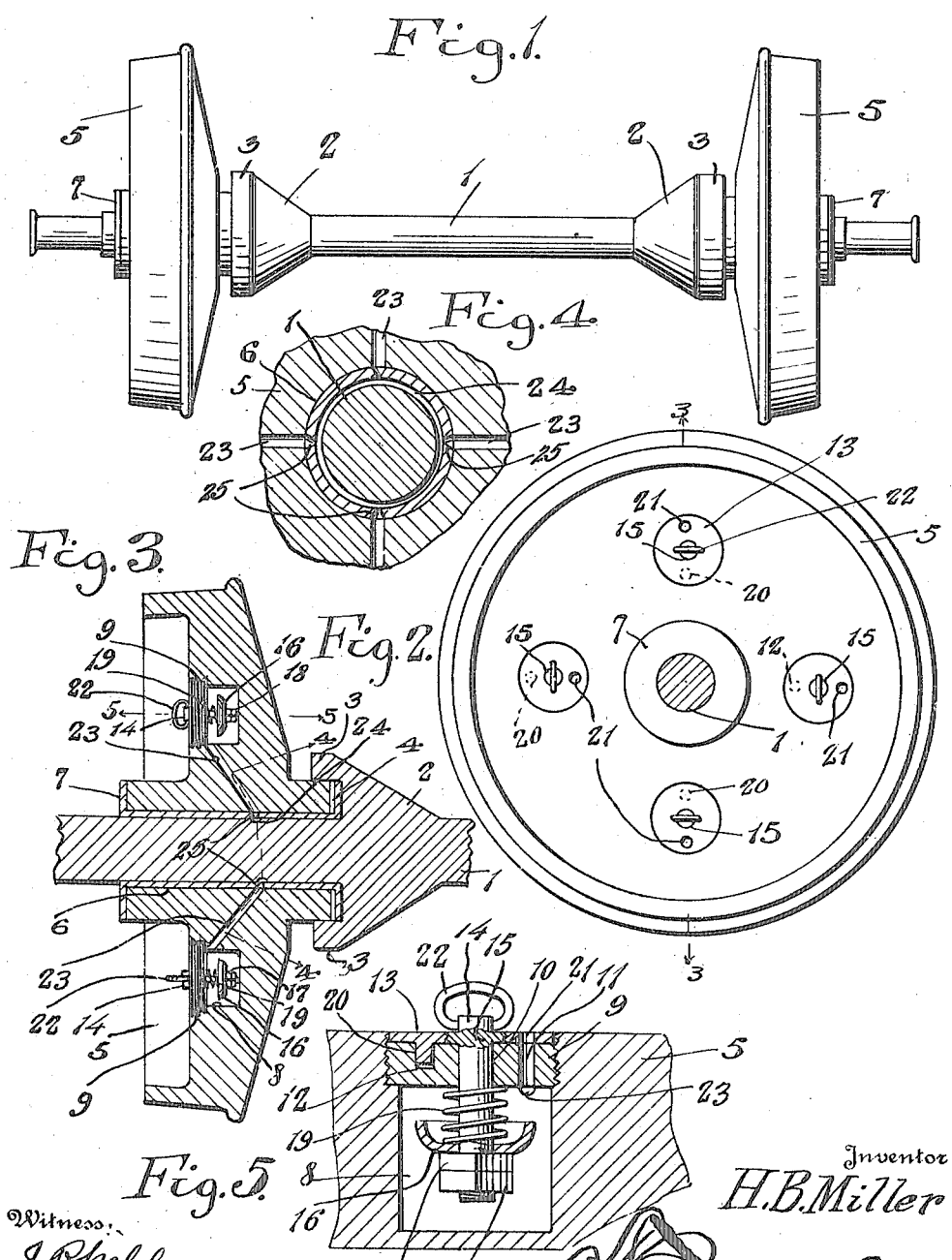

HARVEY B. MILLER, OF STEUBENVILLE, OHIO.

CAR-AXLE AND CAR-WHEEL.

1,257,911.      Specification of Letters Patent.      Patented Feb. 26, 1918.

Application filed November 3, 1916. Serial No. 129,331.

*To all whom it may concern:*

Be it known that I, HARVEY B. MILLER, a citizen of the United States, residing at Steubenville, in the county of Jefferson and State of Ohio, have invented certain new and useful Improvements in Car-Axles and Car-Wheels; and I do hereby declare the following to be a full, clear, and exact description of the invention, such as will enable others skilled in the art to which it appertains to make and use the same.

This invention relates to improvements in car wheels and axles of the type wherein the car wheels turn independently of each other, and an object of the invention is the provision of a car wheel of this type having novel lubricating means associated therewith, which will admit of the effective lubrication of the wheel hub and axle during the turning of the wheel.

Another object of the invention is the provision of a car wheel of this character having a plurality of lubricant conveying passages extending radially of the wheel to provide a gravity feed, and having their inner ends communicating with a collecting groove formed in the axle, whereby when one of the lubricant conveying passages is disposed uppermost when the wheel is at rest the excess lubricant discharged from the same will be directed into the lowermost passage.

A further object of the invention is the provision of novel means for preventing dirt from entering between the wheel hub and the axle.

Other objects will appear and be better understood from that embodiment of my invention of which the following is a specification, reference being had to the accompanying drawing forming a part thereof, in which:

Figure 1 is a side view of an axle with the car wheels associated therewith,

Fig. 2 is a view of the outer side of one of the wheels,

Fig. 3 is a vertical sectional view, taken on the line 3—3 of Fig. 2,

Fig. 4 is a detail sectional view, taken on the line 4—4 of Fig. 3, and

Fig. 5 is a detail view, taken on the line 5—5 of Fig. 3.

Referring to the drawing in detail, the numeral 1 designates a car axle having formed integral therewith, adjacent the opposite ends, a pair of conical shaped bodies 2, the base portions of the conical shaped bodies facing the terminals of the ends of the axle 1, and are provided with concentric flanges 3, which coöperate with the axle to provide annular recesses 4. Mounted for rotation on the opposite ends of the axle 1 is a pair of wheels 5. These wheels 5 have inner convex faces, and the hubs of the wheels have their opposite ends extending beyond the opposite sides of the wheels, as shown in Fig. 3 of the drawing. The inner ends of the hubs extend into the recesses 4 to admit of the flanges 3 engaging over the inner ends of the hubs, as shown more clearly in Fig. 3 of the drawing. The hubs of the wheels 5 have fitted therein linings 6, which have their opposite ends flanged, as shown at 7. Each of the wheels 5 has a plurality of chambers 8 formed therein for receiving lubricant, and the outer ends of the walls of the chambers 8 are threaded and threadedly receive circular heads 9. The heads 9 are concentrically provided with openings 10, and disposed on opposite sides of the opening 10 in each head 9 is a filling opening 11 and a recess 12. Disks 13 are movably mounted on the heads 9 and have openings therein concentrically disposed with the openings 10 in the heads. Stems 14 extend through the openings in the disks 13 and the openings 10 in the heads 9 and are provided with circular flanges 15 which are threadedly received by the openings in the disks 13. The inner ends of the stems 14 extend into the chambers 8 and carry annular heads 16, which are held in position on the inner ends of the stems 14 by means of nuts 17 and jam nuts 18. Expansive helical springs 19 encircle the inner ends of the stems 14 and are interposed between the heads 9 and 16, and serve to normally retain the disks 13 in engagement with the adjacent heads 9. Each of the disks 13 has its inner face provided with a laterally extending lug 20, which is adapted to be received by the recess 12 in the adjacent heads 9, when the disk is in the position shown in Fig. 5. Each of the disks 13 is also provided with an opening 21, which is adapted to aline with the filling opening 11 when the projection or lug 20 on the disk is received by the recess 12, so as to admit of lubricant being deposited within the adjacent chamber 8. After the chambers 8 are filled with lubricant the stems 14 are pulled outwardly to withdraw the lugs 20 from the recesses 12 in the heads 9, and the stems 14 are then rotated so as to move the opening 21 in the disk 13 out of registration with the openings 11 in the heads 9, and to aline the lugs or projections 20 with the openings 11. The stems 14 are then released and the springs 19 will move the stems inwardly so as to cause the lugs 20 to project into the openings 11 in the heads 9 so as to close the openings 11. The stems 14 have their outer ends provided with handles 22 which admit of the stems 14 being conveniently moved outwardly. The chambers 8 communicate with the outer ends of inclined lubricant conveying passages 23, the inner ends of the passages being communicated with a circular groove 24 formed in the axle 1. Each groove 24 in the axle is arranged in communication with an opening 25 formed in the adjacent lining 6. By virtue of the provision of the groove 24 in the axle and the opening 25 in the adjacent lining 6, lubricant can be conveyed to the axle, as each of the chambers 8 are brought uppermost, during the rotation of the wheel. The groove 24 also admits of any excess lubricant which is conveyed to the axle from the uppermost chamber 8, when the wheel is not in motion, being distributed to the lowermost conveying passage 23 and the adjacent lubricant chamber 8, so as to prevent waste of the lubricant. The openings 25 are restricted so as to prevent too large a quantity of lubricant being fed from the distributing passage.

It is evident that various changes might be resorted to in the construction, form and arrangement of the several parts without departing from the spirit and scope of the invention as claimed.

Having thus described my invention what I claim as new, is:

In a device as set forth, of a car wheel having a lubricant receiving chamber formed therein and opening into one face of the wheel, a head removably mounted in said chamber and having a filling opening formed therein, a disk mounted in the outer end of said opening and provided with a filling opening adapted for alinement with the filling opening formed in the head, said head provided with a recess, a lug formed upon the inner surface of said disk and seated in said recess when said filling openings aline, a pin connected to and extending centrally through said disk, said pin extending slidably through said head, a spring carried by said pin for yieldably holding said disk for facial abutment with said head, said lug adapted to be seated in the filling opening in said head after said chamber has been filled, said wheel provided with a diagonal inwardly extending duct extending toward the center of the wheel from said chamber.

In testimony whereof I affix my signature in presence of two witnesses.

HARVEY B. MILLER.

Witnesses:
 John D. Scott,
 P. P. Lewis.

Copies of this patent may be obtained for five cents each, by addressing the "Commissioner of Patents, Washington, D. C."